United States Patent
Horiuchi

(10) Patent No.: US 9,866,720 B2
(45) Date of Patent: Jan. 9, 2018

(54) IMAGE FORMING APPARATUS HAVING IMAGE MAGNIFICATION CORRECTION

(71) Applicant: CANON KABUSHIKI KAISHA, Tokyo (JP)

(72) Inventor: Izuru Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/212,033

(22) Filed: Jul. 15, 2016

(65) Prior Publication Data
US 2017/0026536 A1   Jan. 26, 2017

(30) Foreign Application Priority Data
Jul. 24, 2015 (JP) .................................. 2015-146932

(51) Int. Cl.
| G06F 15/00 | (2006.01) |
| H04N 1/04 | (2006.01) |
| H04N 1/06 | (2006.01) |
| H04N 1/113 | (2006.01) |

(52) U.S. Cl.
CPC ............. *H04N 1/0432* (2013.01); *H04N 1/06* (2013.01); *H04N 1/113* (2013.01); *H04N 2201/0094* (2013.01)

(58) Field of Classification Search
CPC ......... H04N 1/0432; H04N 2201/0094; H04N 1/113; H04N 1/06
USPC ........................................................ 358/1.2
See application file for complete search history.

(56) References Cited

U.S. PATENT DOCUMENTS 7,564,596 B2 * 7/2009 Okamoto ................... B41J 3/54
358/1.15

FOREIGN PATENT DOCUMENTS

JP          2013-22913 A    2/2013

* cited by examiner

*Primary Examiner* — Saeid Ebrahimi Dehkord
(74) *Attorney, Agent, or Firm* — Canon USA Inc., IP Division

(57) ABSTRACT

By dispersing within an image magnified pixels subjected to magnification correction with the use of pseudorandom numbers, an occurrence of a moire pattern in an image is suppressed.

10 Claims, 14 Drawing Sheets

FIG. 5

| INPUT DATA | \\ OUTPUT POSITION | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 0 | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 2 | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |
| 3 | | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| 4 | | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |
| 5 | | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| 6 | | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| 7 | | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 |
| 8 | | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 9 | | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |
| 10 | | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |
| 11 | | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 |
| 12 | | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 |
| 13 | | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 |
| 14 | | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 |
| 15 | | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |

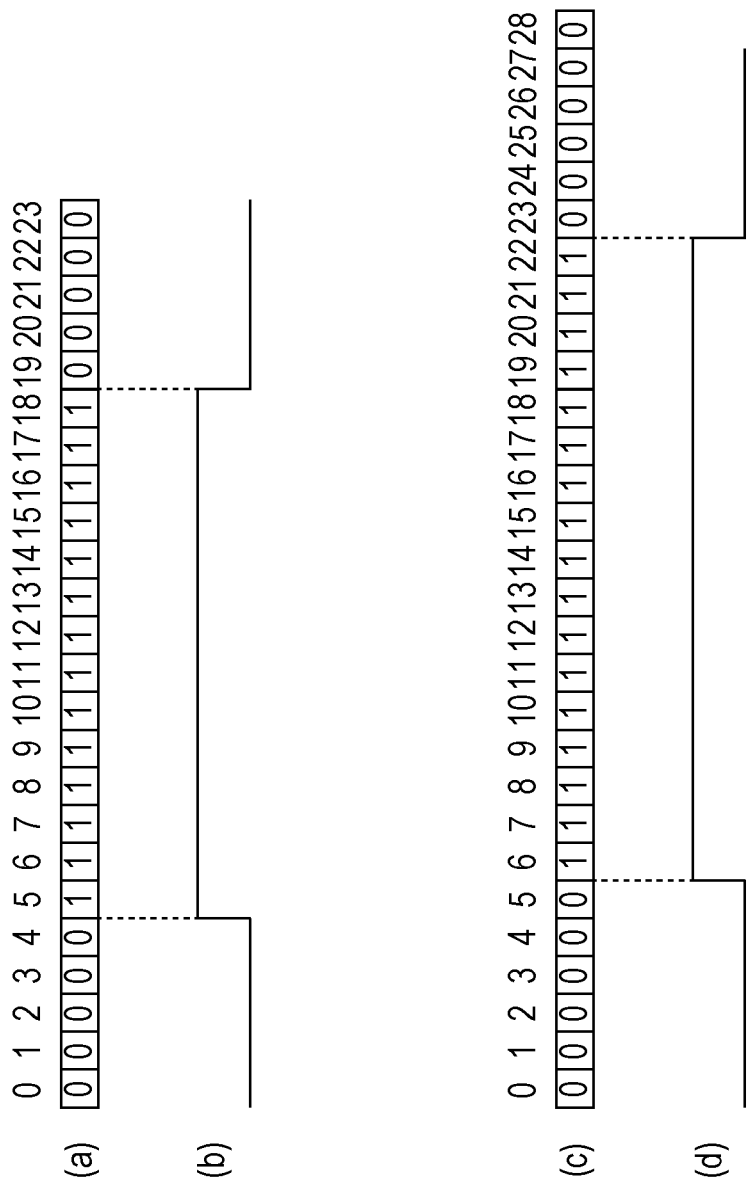

FIG. 8

| D [x] | COPY POSITION | | | | | | | |
|---|---|---|---|---|---|---|---|---|
| 0 | — | — | — | — | — | — | — | — |
| 1 | 11 | — | — | — | — | — | — | — |
| 2 | 7 | 15 | — | — | — | — | — | — |
| 3 | 5 | 11 | 17 | — | — | — | — | — |
| 4 | 3 | 8 | 13 | 18 | — | — | — | — |
| 5 | 3 | 7 | 11 | 15 | 19 | — | — | — |
| 6 | 2 | 5 | 9 | 12 | 16 | 19 | — | — |
| 7 | 2 | 5 | 8 | 11 | 14 | 17 | 20 | — |
| 8 | 1 | 4 | 7 | 9 | 12 | 15 | 17 | 20 |

FIG. 9

| X | 0 | 1 | 2 | ... | M-1 | M | M+1 | ... | N-2 | N-1 | N |
|---|---|---|---|---|---|---|---|---|---|---|---|
| D [X] | 0 | 0 | 1 | ... | 7 | 8 | 7 | | 1 | 0 | 0 |
| Ddif [X] | — | 0 | +1 | | 0 | +1 | -1 | | 0 | -1 | 0 |

FIG. 10

| REGISTER NAME | OFFSET VALUE |
|---|---|
| R0 | 4 |
| R1 | 2 |
| R2 | 6 |
| R3 | 1 |
| R4 | 0 |
| R5 | 7 |
| R6 | 3 |
| R7 | 5 |

FIG. 11A

|  | MAIN SCANNING DIRECTION → | | | | | | | | | | | |
|---|---|---|---|---|---|---|---|---|---|---|---|---|
| LINE 1  | 24 | 24 | 25 | 24 | 24 | 25 | 24 | 24 | 25 | 24 | 24 | 25 |
| LINE 2  | 24 | 24 | 25 | 24 | 24 | 25 | 24 | 24 | 25 | 24 | 24 | 25 |
| LINE 3  | 24 | 24 | 25 | 24 | 24 | 25 | 24 | 24 | 25 | 24 | 24 | 25 |
| LINE 4  | 24 | 24 | 25 | 24 | 24 | 25 | 24 | 24 | 25 | 24 | 24 | 25 |
| LINE 5  | 24 | 24 | 25 | 24 | 24 | 25 | 24 | 24 | 25 | 24 | 24 | 25 |
| LINE 6  | 24 | 24 | 25 | 24 | 24 | 25 | 24 | 24 | 25 | 24 | 24 | 25 |
| LINE 7  | 24 | 24 | 25 | 24 | 24 | 25 | 24 | 24 | 25 | 24 | 24 | 25 |
| LINE 8  | 24 | 24 | 25 | 24 | 24 | 25 | 24 | 24 | 25 | 24 | 24 | 25 |
| LINE 9  | 24 | 24 | 25 | 24 | 24 | 25 | 24 | 24 | 25 | 24 | 24 | 25 |
| LINE 10 | 24 | 24 | 25 | 24 | 24 | 25 | 24 | 24 | 25 | 24 | 24 | 25 |
| LINE 11 | 24 | 24 | 25 | 24 | 24 | 25 | 24 | 24 | 25 | 24 | 24 | 25 |
| LINE 12 | 24 | 24 | 25 | 24 | 24 | 25 | 24 | 24 | 25 | 24 | 24 | 25 |
| LINE 13 | 24 | 24 | 25 | 24 | 24 | 25 | 24 | 24 | 25 | 24 | 24 | 25 |
| LINE 14 | 24 | 24 | 25 | 24 | 24 | 25 | 24 | 24 | 25 | 24 | 24 | 25 |
| LINE 15 | 24 | 24 | 25 | 24 | 24 | 25 | 24 | 24 | 25 | 24 | 24 | 25 |
| LINE 16 | 24 | 24 | 25 | 24 | 24 | 25 | 24 | 24 | 25 | 24 | 24 | 25 |

FIG. 15A

| X | 0 | 1 | 2 | 3 | 4 | 5 | 6 | 7 | 8 | 9 | 10 | 11 | 12 | 13 | 14 | ... |
|---|---|---|---|---|---|---|---|---|---|---|----|----|----|----|----|-----|
| PIXEL (CORRECTION TARGET REGION) | 0 | | | | 1 | | | | 2 | | | 3 | | | 4 | ... |
| D [X] | 0 | 0 | 0 | 0 | 0 | 1 | 0 | 1 | 1 | 1 | 1 | 1 | 1 | 1 | 2 | ... |
| MEAN CORRECTION AMOUNT | 0/72 | 1/72 | | | | | 2/72 | | | 3/72 | | | 4/72 | | | ... |
| IMAGE MAGNIFICATION AFTER CORRECTION | 100.0% | 101.4% | | | | | 102.7% | | | 104.2% | | | 105.5% | | | ... |

FIG. 15B

| X | ... | M-2 | | | M-1 | | | M | | | M+1 | | | M+2 | | | ... |
|---|-----|-----|---|---|-----|---|---|---|---|---|-----|---|---|-----|---|---|-----|
| PIXEL (CORRECTION TARGET REGION) | ... | n0 | n1 | n2 | n3 | n4 | n5 | n6 | n7 | n8 | n9 | n10 | n11 | n12 | n13 | n14 | ... |
| D [X] | ... | 7 | 7 | 8 | 7 | 8 | 8 | 8 | 8 | 8 | 8 | 8 | 7 | 8 | 7 | 7 | ... |
| MEAN CORRECTION AMOUNT | ... | 22/72 | | | 23/72 | | | 24/72 | | | 23/72 | | | 22/72 | | | ... |
| IMAGE MAGNIFICATION AFTER CORRECTION | ... | 130.5% | | | 131.9% | | | 133.3% | | | 131.9% | | | 130.5% | | | ... |

IMAGE FORMING APPARATUS HAVING IMAGE MAGNIFICATION CORRECTION

BACKGROUND OF THE INVENTION

Field of the Invention

The present invention relates to methods of correcting magnification in the main scanning direction in image forming apparatuses, such as multi-function printers (MFPs) and the like.

Description of the Related Art

A conventional image forming apparatuses includes an optical scanning device that emits a laser beam for scanning a photosensitive member. The optical scanning device includes a laser light source that emits a laser beam and a deflection unit (e.g., rotatable polygon mirror) that deflects the laser beam emitted by the laser light source so as to scan the photosensitive member with the laser beam. The laser beam deflected by the deflection unit is imaged on the photosensitive member through an optical lens, such as an f-theta (fθ) lens, designed such that the scanning speed on the photosensitive member is substantially constant.

Although the optical lens is designed with high precision, it is not possible to fabricate an optical lens with precision that satisfies the precision of the design, and thus there is often a small error in the optical performance of the optical lens. Therefore, if that error is not corrected, the magnification of an image in each of a plurality of regions in the main scanning direction may vary.

In order to address such errors, Japanese Patent Laid-Open No. 2013-22913 discloses an image forming apparatus that corrects driving data for driving a laser light source in units of smaller than one pixel. With the image forming apparatus disclosed in Japanese Patent Laid-Open No. 2013-22913, the magnification of an image in the main scanning direction may be obtained without errors.

In the meantime, there is an increasing demand for cost reduction of an optical scanning device in order to further reduce the cost of an image forming apparatus. One way to achieve cost reduction of an optical scanning device is to design an optical scanning device that is not provided with a scanning lens or to design an optical scanning device provided with a less expensive scanning lens that is inferior to a conventional optical lens in terms of the optical performance.

However, an optical scanning device that is not provided with a scanning lens or an image forming apparatus that is provided with an inexpensive scanning lens may not satisfy the requirements for high-quality imaging.

FIG. 13 illustrates a variation of the image magnification in the main scanning direction (variation in the scan width per unit time) in an optical scanning device that is not provided with a scanning lens. The main scanning direction corresponds to the direction in which a laser beam scans a photosensitive member. In FIG. 13, the horizontal axis represents the position in the main scanning direction (main scanning position/image height). The vertical axis in FIG. 13 represents the magnification of the image.

In the optical scanning device that is not provided with a scanning lens, the scanning speed of the laser beam is higher toward an end portion of the photosensitive member. Therefore, when a laser light source is driven in a condition in which the number of pieces of bit data per pixel in each region is set to be constant and the bit data is output to a laser driver in accordance with a clock signal of a constant cycle from a controller, the magnification of the image increases toward the end portion of the photosensitive member, as illustrated in FIG. 13. For example, in some image forming apparatuses, the correction magnification at positions that are ±150 mm from the respective end portions of the photosensitive member is as high as 30%, as illustrated in FIG. 13. The width of the image at each scanning position can be made substantially uniform by electrically correcting the image width by a reciprocal of the image magnification illustrated in FIG. 13.

Digital pulse width modulation (PWM) is a known method for correcting scan unevenness such as pixel magnification at positions away from the respective end portions of the photosensitive member. In the digital PWM correction method, a bit pattern containing a plurality of pieces of bit data is generated, for example, by changing the number of bits in a bit pattern, which is multi-valued image data indicating the density of an image. The bit data contained in the generated bit pattern is binary data that turns ON or OFF the laser light source. The image forming apparatus outputs the bit data contained in the bit pattern, one bit by one bit, in synchronization with an image clock of a constant frequency, and controls ON/OFF states of the laser light source. Processing for correcting the magnification of an image by changing the number of pieces of bit data contained in a bit pattern in accordance with the scanning position in the main scanning direction is performed according to the digital PWM.

For example, an image forming apparatus that converts image data corresponding to one pixel to a bit pattern that contains 24 pieces (N=24) of bit data and that corrects the number of pieces of bit data in this bit pattern will be considered. This image forming apparatus corrects the magnification M of each pixel in the main scanning direction in a range of $1 \leq M \leq 1.33$. The correction of magnification for each pixel is defined by $(N+D)/N=M$. Here, N is the number of pieces of bit data corresponding to one pixel, D represents the number of pieces of bit data to be added to the bit pattern of the one pixel, and M is the magnification of the one pixel as function of its position along the main scanning direction. D is set to any one of the integers in a range of $0 \leq D \leq 8$ in accordance with the position of the pixel in the main scanning direction. Desired magnification correction can be achieved by varying D for each pixel. For example, when D is 0, the magnification turns out to be $(24+0)/24=1$. When D is 8, the magnification turns out to be $(24+8)/24=1.33$. Accordingly, the data that indicates the correction magnification for each pixel may contain the bits in a number that can represent the number of integers that D can take. In the foregoing example, the number of integers that D can take is nine ranging from 0 through 8, and thus the data set can be expressed in four ($\geq \log_2 9$, and integer) bits.

As illustrated in FIG. 13, for an image forming apparatus including an optical scanning device that is not provided with a scanning lens, the correction magnification needs to be determined in accordance with the pixel position in the main scanning direction (horizontal axis in FIG. 13). However, moire pattern may be generated when similar magnification correction is carried out on each pixel in a plurality of lines.

FIGS. 14A-1 through 14B-2 illustrate examples in which moire is produced. Each block in FIG. 14A-1 corresponds to one pixel, and each pixel is constituted by a bit pattern represented by a 24-bit data set. FIG. 14A-2 illustrates an image formed when a PWM signal is generated through the bit patterns illustrated in FIG. 14A-1 and a laser light source is driven by this PWM signal. Meanwhile, each block in FIG. 14B-1 corresponds to one pixel, and each pixel is constituted by either a bit pattern of 24-bit data set or a bit pattern of a 25-bit data set. The 25-bit data set bit pattern is a data array obtained by adding, through magnification correction processing, one piece of bit data to the bit pattern that corresponds to one pixel and that is originally constituted by a 24-bit data set. FIG. 14B-2 illustrates an image formed when a PWM signal is generated through the bit patterns illustrated in FIG. 14B-1 and a laser light source is driven by this PWM signal.

FIG. 14B-1 illustrates an example in which pixels that have been subjected to magnification correction are included periodically in the main scanning direction. FIG. 14B-2 indicates, as shown with a white triangle, that the width of some lines is not uniform.

The present invention is directed to providing high quality correction of image magnification that makes moire generated through interference between the periodicity of magnification correction and the periodicity of an image pattern less visually noticeable.

SUMMARY OF THE INVENTION

An image forming apparatus according to an aspect of the present invention includes a photosensitive member, a laser light source configured to emit a laser beam, a deflection unit configured to deflect the laser beam so as to scan the photosensitive member with the laser beam, a developing unit configured to develop an electrostatic latent image formed on the photosensitive member upon the photosensitive member being scanned by the laser beam deflected by the deflection unit, a data conversion unit configured to convert a first bit pattern indicating a density of one pixel to a second bit pattern containing a plurality of pieces of bit data that turns ON or OFF the laser light source, a setting unit configured to set correction data that is set for each pixel in order to correct magnification of an image in a main scanning direction, where the correction data corresponds to a plurality of scanning positions of the laser beam in the main scanning direction, a correction unit configured to correct the second bit pattern on the basis of the correction data set by the setting unit and configured to add, to the second bit pattern, bit data in a number of positions in the main scanning direction on the basis of the correction data, an output unit configured to output the bit data contained in the second bit pattern corrected by the correction unit, one bit by one bit, in synchronization with a clock signal, and a driving unit configured to turn ON or OFF a supply of an electric current to the laser light source on the basis of the bit data output by the output unit. The correction unit selects within the image a magnified pixel to be subjected to magnification correction by using a pseudorandom number.

Further features of the present invention will become apparent from the following description of exemplary embodiments with reference to the attached drawings.

BRIEF DESCRIPTION OF THE DRAWINGS

FIG. 5 illustrates conversion table data stored in a read-only memory (ROM).

FIG. 6 illustrates a relationship between a bit pattern and a PWM signal.

FIG. 8 illustrates a correction data table.

FIG. 9 illustrates a method of storing a magnification profile.

FIG. 10 illustrates registers that store pseudorandom numbers.

FIGS. 11A and 11B illustrate a state in which correction pixels are dispersed in accordance with pseudorandom numbers.

FIGS. 14A-1 through 14B-2 are illustrations for describing an example in which moire is generated.

FIGS. 15A and 15B are illustrations for describing correction resolution.

DESCRIPTION OF THE EMBODIMENTS

First Exemplary Embodiment

Image Forming Apparatus

Figure 1:
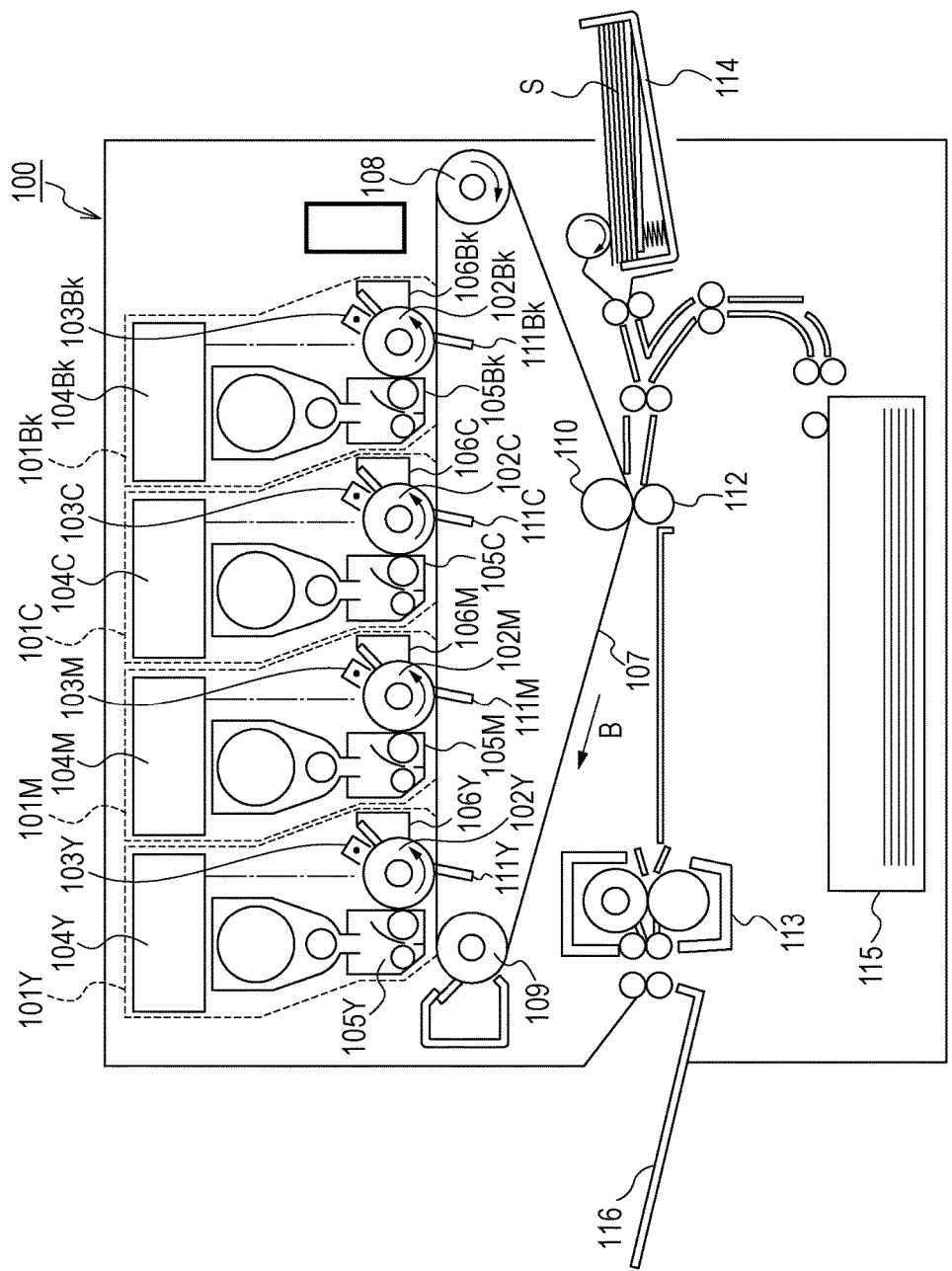
FIG. 1 is a schematic sectional view of an image forming apparatus.

FIG. 1 is a schematic sectional view of an image forming apparatus 100 that forms an image by using toners of a plurality of colors. The image forming apparatus 100 includes four image forming units 101Y, 101M, 101C, and 101Bk. The suffixes Y, M, C, and Bk represents yellow, magenta, cyan, and black, respectively. The image forming units 101Y, 101M, 101C, and 101Bk form images by using yellow, magenta, cyan, and black toners, respectively. The image forming units 101Y, 101M, 101C, and 101Bk include, respectively, photosensitive drums 102Y, 102M, 102C, and 102Bk, which serve as photosensitive members. Charging devices 103Y, 103M, 103C, and 103Bk, optical scanning devices 104Y, 104M, 104C, 104Bk, and developing devices 105Y, 105M, 105C, and 105Bk are provided around the respective photosensitive drums 102Y, 102M, 102C, and 102Bk. In addition, drum cleaning devices 106Y, 106M, 106C, and 106Bk are disposed around the respective photosensitive drums 102Y, 102M, 102C, and 102Bk.

An intermediate transfer belt 107, which is an endless belt, is disposed underneath the photosensitive drums 102Y, 102M, 102C, and 102Bk. The intermediate transfer belt 107 is stretched on a driving roller 108 and driven rollers 109 and 110 and rotates in the direction indicated by the arrow B in FIG. 1 while an image is being formed. In addition, primary transfer devices 111Y, 111M, 111C, and 111Bk are provided at positions that oppose the respective photosensitive drums 102Y, 102M, 102C, and 102Bk with the intermediate transfer belt 107 (intermediate transfer member) interposed therebetween. Furthermore, the image forming apparatus 100 according to the present exemplary embodiment includes a secondary transfer device 112 for transferring a toner image on the intermediate transfer belt 107 onto a recording medium S and a fixing device 113 for fixing the toner image on the recording medium S.

An image forming process covering from a charging step to a developing step in the image forming apparatus 100 configured as described above will now be described. This image forming process is identical among the image forming units. Thus, the image forming process will be described with the image forming unit 101Y serving as an example, and descriptions of the image forming process in the image forming units 101M, 101C, and 101Bk will be omitted. First, the photosensitive drum 102Y that is rotationally driven is charged by the charging device 103Y of the image forming unit 101Y. The charged photosensitive drum 102Y is exposed by a laser beam emitted from the optical scanning device 104Y. Through this, an electrostatic latent image is formed on the rotating photosensitive member. Thereafter, this electrostatic latent image is developed into a yellow toner image by the developing device 105Y. Hereinafter, the image forming process from a transfer step will be described with the image forming units 101Y, 101M, 101C, and 101Bk serving as an example. The primary transfer devices 111Y, 111M, 111C, and 111Bk apply transfer biases on the intermediate transfer belt 107, and thus the yellow, magenta, cyan, and black toner images formed on the respective photosensitive drums 102Y, 102M, 102C, and 102Bk of the image forming units 101Y, 101M, 101C, and 101Bk are transferred onto the intermediate transfer belt 107. Through this, the toner images of the respective colors are superposed onto each other on the intermediate transfer belt 107. Upon the four-color toner image being transferred onto the intermediate transfer belt 107, the four-color toner image transferred on the intermediate transfer belt 107 is again transferred (secondary transfer) by the secondary transfer device 112 onto the recording medium S conveyed to a secondary transfer unit from a manual feed cassette 114 or from a feed cassette 115. Then, the toner image on the recording medium S is thermally fixed by the fixing device 113 and is discharged to a discharge unit 116. Through the process described above, a full-color image is formed on the recording medium S.

Optical Scanning Device

Figure 2:
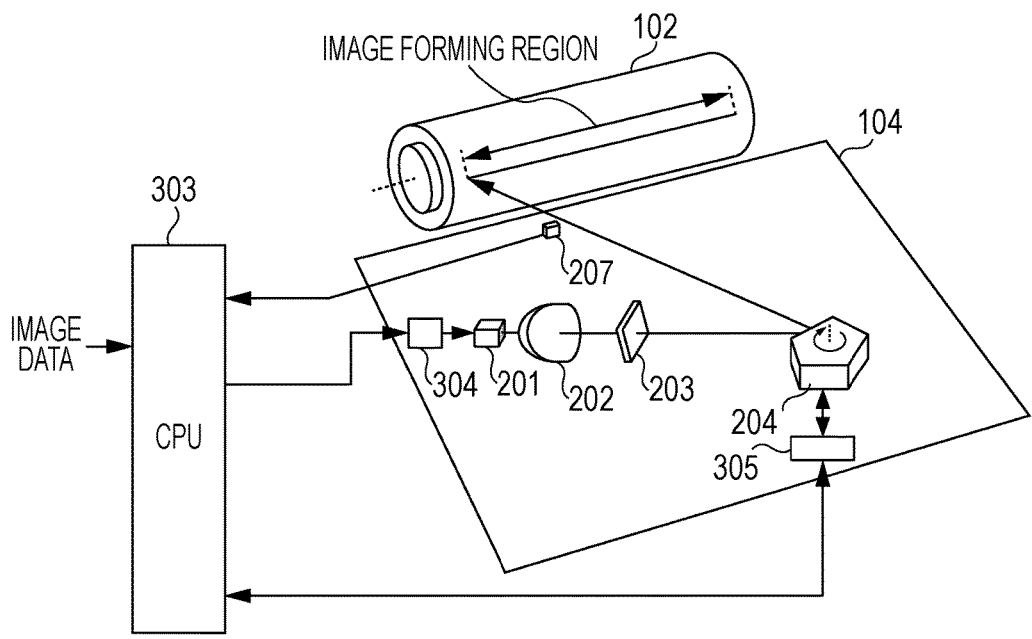
FIG. 2 is a schematic diagram illustrating a relationship among a photosensitive drum, an optical scanning device, and a central processing unit (CPU).

With reference to FIG. 2, an optical scanning device 104 will be described. FIG. 2 is a schematic diagram illustrating a relationship among a photosensitive drum 102, the optical scanning device 104, and a CPU 303. The configurations of the photosensitive drum and of the optical scanning device are identical for each of the colors, and thus the suffixes Y, M, C, and Bk representing the colors will be omitted in the following description.

The optical scanning device 104 includes a laser light source 201 (semiconductor laser) that emits a laser beam (light beam). The laser beam emitted by the laser light source 201 is incident on a collimator lens 202 that shapes the laser beam into a parallel light beam. The laser beam that has passed through the collimator lens 202 is incident on a cylindrical lens 203 that condenses the laser beam in a sub-scanning direction (the direction corresponding to the direction in which the photosensitive drum 102 rotates). The laser beam that has passed through the cylindrical lens 203 is incident on a polygon mirror (rotatable polygon mirror) 204.

The polygon mirror 204 has a plurality of reflective surfaces. The polygon mirror 204 rotates with a driving force from a motor (not illustrated). This motor is driven by a motor driving unit 305 (e.g., a microcontroller). The polygon mirror 204 deflects the laser beam by the plurality of reflective surfaces. The laser beam reflected by a reflective surface of the polygon mirror 204 scans the photosensitive drum 102. As illustrated in FIG. 2, no lens is disposed between the polygon mirror 204 (deflection unit) and the photosensitive drum 102. Therefore, due to the lack of an f-theta lens, an image forming apparatus can be manufactured and maintained at a reduced cost. However, care must be taken to correct image magnification due to unevenness of scanning.

The optical scanning device 104 includes a beam detector (BD) 207 that receives a laser beam deflected by a reflective surface of the polygon mirror 204 and outputs a horizontal synchronization signal (hereinafter, referred to as a BD signal) in response to receiving the laser beam. The BD 207 is disposed in a scanning path of the laser beam. The BD 207 is disposed at a position that is in the scanning path of the laser beam and that is outside an image forming region on the photosensitive drum 102.

The optical scanning device 104 includes a laser driver 304. The laser driver 304 receives a PWM signal from the CPU 303. The PWM signal is a driving signal for controlling ON/OFF states of the laser light source 201. For example, when the level of the PWM signal output from the CPU 303 is high, the laser driver 304 operates so as to supply a current with a value that is equal to or greater than a threshold current value to the laser light source 201. Upon being supplied with a current with a value that is equal to or greater than a threshold current value, the laser light source 201 emits a laser beam that can change the potential of the surface of the photosensitive drum 102. Meanwhile, when the level of the PWM signal output from the CPU 303 is low, the laser driver 304 operates so as not to supply a current to the laser light source 201 or so as to supply a bias current with a value less than the threshold current value.

Figure 3:
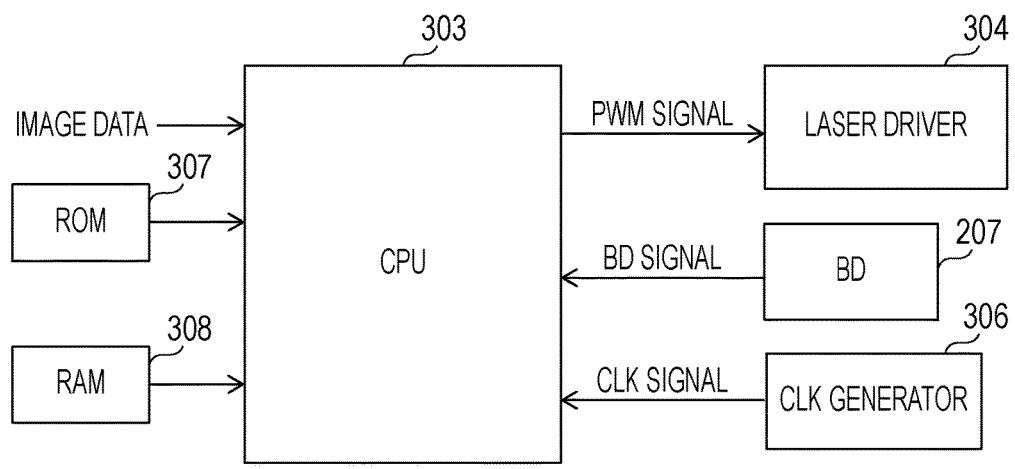
FIG. 3 is a control block diagram of the image forming apparatus.

With reference to FIG. 3, a control block-diagram of the image forming apparatus according to the present exemplary embodiment will now be described. The image forming apparatus according to the present exemplary embodiment includes the CPU 303, a clock generator 306 (CLK generator), a ROM 307, and a random-access memory (RAM) 308. The CPU 303 controls the image forming apparatus on the basis of a control program and control data stored in the ROM 307 and control data stored in the RAM 308. The CPU 303 executes various processes in synchronization with a clock signal (CLK signal) from the CLK generator 306. In this example, the frequency of the CLK signal output by the CLK generator 306 is 154 MHz.

The CPU 303 receives image data from a reading apparatus (not illustrated) or an external information apparatus, such as a personal computer (PC). The CPU 303 generates a PWM signal on the basis of the image data and outputs this PWM signal to the laser driver 304. The CPU 303 outputs the PWM signal at a timing that is based on a BD signal input from the BD 207.

Figure 4:
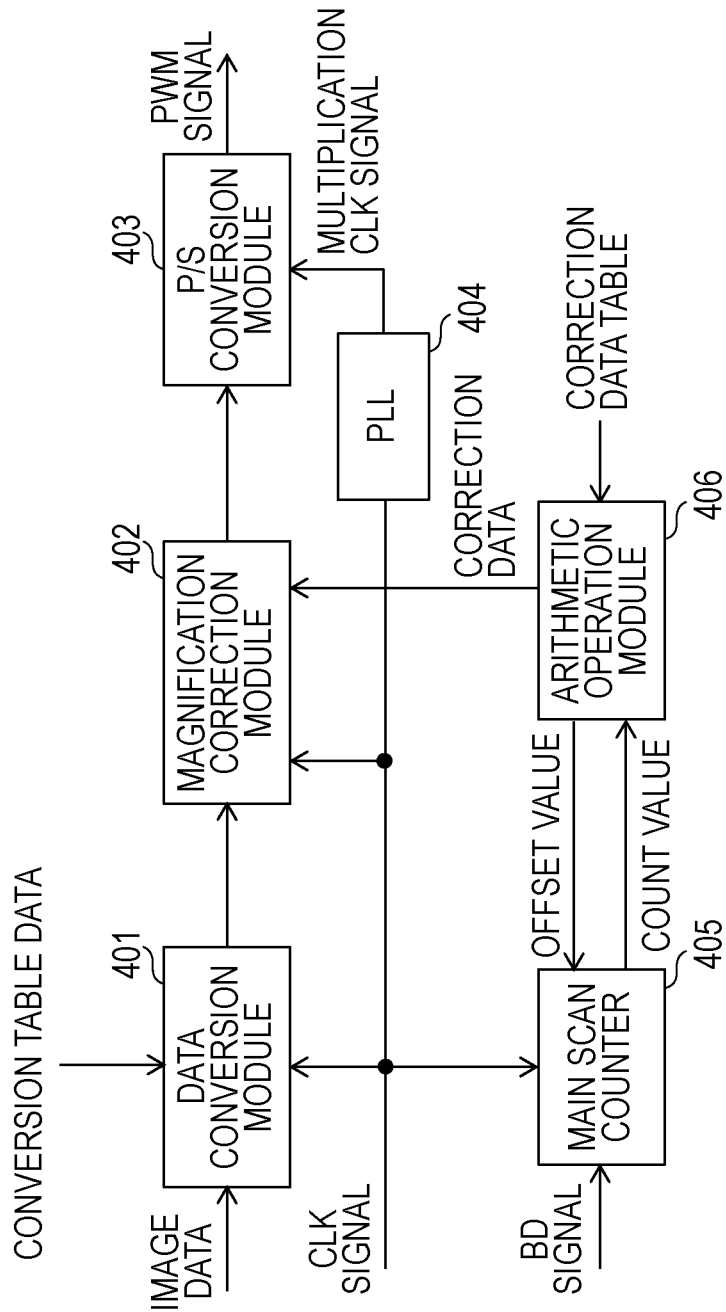
FIG. 4 is an internal module diagram of the CPU.

With reference to FIG. 4, the CPU 303 will be described in detail. The CPU 303 includes a data conversion module 401, a magnification correction module 402, a parallel/serial conversion module 403 (P/S conversion module), a phase locked loop (PLL) 404, a main scan counter 405, and an arithmetic operation module 406.

The data conversion module 401 receives an input of image data corresponding to a predetermined range on the photosensitive drum 102. The predetermined range is the unit of correction for carrying out image magnification correction, which will be described later. To simplify the description, the predetermined range according to the present exemplary embodiment is one pixel (e.g., a range of 600 dpi by 600 dpi). The predetermined range does not have to correspond to the size of one pixel. The image data input to the data conversion module 401 is pixel data that indicates the density of one pixel formed in the predetermined range, and is 4-bit multi-valued bit data in the present exemplary embodiment. Accordingly, the input 4-bit image data corresponds to one pixel, and a bit pattern 24-bits long (described later) generated on the basis of this 4-bit image data serves as the unit of a single instance of correction.

The data conversion module 401 retrieves conversion table data (FIG. 5) stored in the ROM 307. FIG. 5 illustrates an example of the conversion table data. The input data on the vertical axis corresponds to the aforementioned 4-bit image data. 24-bit binary data is assigned to each of the sixteen values represented by the 4-bit data. The data conversion module 401 converts the values of the input image data to 24-bits long binary patterns by using the conversion table data.

The magnification correction module 402 corrects a 24-bit long bit pattern transmitted from the data conversion module 401 on the basis of correction data input from the arithmetic operation module 406. The correction executed by the magnification correction module 402 corresponds to data processing of adding bit data to the 24-bit long bit pattern. For example, the magnification correction module 402 generates a 25-bits long bit pattern by adding one bit to the 24-bit long bit pattern. The data processing executed by the magnification correction module 402 will be described later.

A CLK signal is input to the magnification correction module 402. The magnification correction module 402 transmits a 24-bit long bit pattern or a 25-bit or longer bit pattern that has been subjected to the data processing in parallel to the P/S conversion module 403 in synchronization with the CLK signal.

The P/S conversion module 403 is a parallel-serial conversion circuit that outputs the bit pattern input from the magnification correction module 402, one bit by one bit.

The P/S conversion module 403 includes a buffer (not illustrated) that stores a bit pattern transmitted from the magnification correction module 402 in synchronization with a CLK signal. The P/S conversion module 403 receives from the PLL circuit 404 an input of a multiplied CLK signal obtained by multiplying the CLK signal times the number of bits in the bit patter (e.g., 24). The P/S conversion module 403 outputs the bit pattern stored in the buffer sequentially from the uppermost bit in synchronization with the multiplied CLK signal. The bit data output serially from the P/S conversion module 403 is input to the laser driver 304 as a PWM signal.

An example of processing through which the CPU 303 generates a PWM signal from image data will now be described with reference to FIG. 6. When image data (1010) is input to the data conversion module 401, the data conversion module 401 converts the image data (1010) to a 24-bits long bit pattern (000001111111111111110000) by using the conversion table data (refer to section (a) in FIG. 6). When the processing of adding bit data is not carried out by the magnification correction module 402, the P/S conversion module 403 outputs the input 24-bit long bit pattern serially one bit by one bit from the uppermost bit (0) in synchronization with the multiplied CLK signal. By carrying out such data conversion processing, the CPU 303 outputs a PWM signal having a pulse duration illustrated in section (b) of FIG. 6 as a signal corresponding to the input image data (1010). In this case, no magnification correction is performed on the image data (1010).

Meanwhile, when the magnification correction module 402 has added five pieces of bit data (five bits of data) to the image data (1010), the magnification correction module 402 outputs a 29-bit long bit pattern (00000011111111111111111110000), as illustrated in section (c) of FIG. 6, to the P/S conversion module 403. The P/S conversion module 403 outputs the 29-bit long bit pattern serially one bit by one bit from the uppermost bit (0) in synchronization with the multiplied CLK signal. By carrying out such data conversion processing, the CPU 303 outputs a PWM signal having a pulse duration illustrated in section (d) of FIG. 6 as a signal corresponding to the input image data (1010).

The correction processing carried out by the magnification correction module 402 will now be described in detail. The CPU 303 carries out data processing for correcting the magnification of the image in accordance with the position in the main scanning direction. In order to carry out the magnification correction, the CPU 303 includes, aside from the magnification correction module 402, the main scan counter 405 and the arithmetic operation module 406.

The main scan counter 405 receives an input of a BD signal (a signal from the beam detector BD 207) and receives an input of a CLK signal from the CLK generator 306. The BD 207 receives a laser beam deflected by a reflective surface of the rotationally driven polygon mirror 204 and outputs a BD signal. The main scan counter 405 resets the count value upon receiving an input of a BD signal from the BD 207. Then, the main scan counter 405 counts CLK signals of a constant frequency. The polygon mirror 204 rotates at a substantially constant speed. The main scan counter 405 is reset each time a BD signal is input thereto. Accordingly, the count value of the main scan counter 405 serves as information indicating the scanning positions of a laser beam along the main scanning direction in a single scan cycle of the laser beam.

The count value of the main scan counter 405 is input to the arithmetic operation module 406. In addition, the arithmetic operation module 406 retrieves, from the ROM 307, data pertaining to a correction amount assigned to each scanning position of the laser beam (count value of the main scan counter 405) and from a correction data table illustrated in FIG. 8. In the image forming apparatus according to the present exemplary embodiment, data pertaining to the correction amount is set for each of 7200 pixels. Therefore, the ROM 307 stores 7200 pieces of magnification correction data D[x] (described later) generated on the basis of FIGS. 14A-1 through 14B-2. The count value of the main scan counter 405 serves as a count value for distinguishing each of the 7200 pixels.

FIG. 8 illustrates a table indicating the number of pieces of bit data (number of bits) to be added to a 24-bit long bit pattern, which is the unit of correction, and at which position in the bit pattern the bit data is to be added. The left-most column (vertical axis) D[x] (x: 0 through 8) of the table illustrated in FIG. 8 represents the number of pieces of bit data (or number of bits) to be added to a bit pattern. The horizontal axis of the table in FIG. 8 represents the position in the bit pattern at which the bit data is to be added. D[x] (x: 0 through 8) is assigned individually to each of a plurality of pixel positions in the main scanning direction as the aforementioned correction amount. The arithmetic operation module 406 outputs D[x] on the basis of the count value of the main scan counter 405.

For example, on the basis of a given count value of the main scan counter 405, the arithmetic operation module 406 specifies the correction amount D[5] corresponding to positions in the main scanning direction. As illustrated in FIG. 8, D[5] means that five pieces of bit data (5 bits) are to be added to the 24-bit long bit pattern. In addition, D[5] is data indicating that pieces of data in the fourth bit, the eighth bit, the 12th bit, the 16th bit, and the 20th bit from the uppermost 0th bit in the bit pattern are to be copied, and the copied pieces of bit data are to be added immediately after the original pieces of bit data.

The arithmetic operation module 406 outputs the specified D[5] to the magnification correction module 402 as correction data. The magnification correction module 402 makes a correction to the 24-bit long bit pattern input from the data conversion module 401 on the basis of the input correction data (D[5]).

FIGS. 15A and 15B will be described. FIG. 15A illustrates correction data for pixels from the first pixel to the 15th pixel in the main scanning direction. FIG. 15B illustrates correction data for 15 pixels across the center (M=3600th pixel) in the main scanning direction. The correction data D[x] is set for each of the pixels. The arithmetic operation module 406 determines the correction data D[x] on the basis of the count value of the main scan counter 405.

As illustrated in FIGS. 15A and 15B, the correction data D[x] is set for a plurality pixels (three pixels) that serve as the unit of a single instance of correction. For example, in FIG. 15A, the correction data D[x] for the first three pixels is "0" for each pixel. In addition, in FIG. 15A, the correction data D[x] for the seventh through ninth pixels from the beginning is "0," "1," and "1," respectively.

Figure 7A:
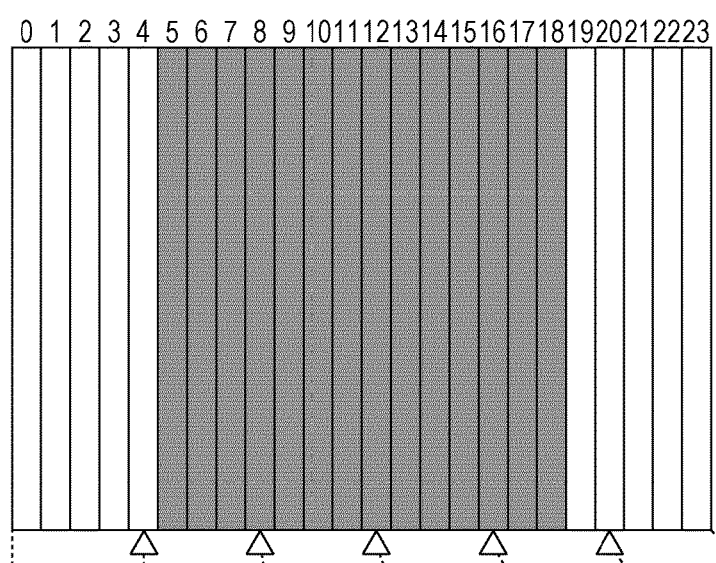
FIGS. 7A and 7B illustrate an exposure region on the photosensitive drum.

When the magnification correction is to be carried out pixel by pixel, the correction resolution is 1/24=4.3% at a minimum. On the other hand, by setting the correction data in units of a plurality pixels, the correction resolution can be improved as compared to a case in which the magnification correction is carried out pixel by pixel. In other words, as illustrated in FIG. 15A, when the correction is carried out in units of three pixels, the correction magnifications for the respective three-pixel units are as follows: 0% for pixels 0-2, 1.4% for pixels 3-5, 2.7% for pixels 6-8, 4.2% for pixels 9-11, and 5.5% for pixels 12-14. The correction resolution in this case is 1/72=1.3%. FIG. 7A illustrates an exposure condition of the photosensitive drum 102 corresponding to a PWM signal generated from a bit pattern 24-bits long to which no bit data has been added by the magnification correction module 402. Meanwhile, FIG. 7B illustrates an exposure condition of the photosensitive drum 102 corresponding to a PWM signal generated from a corrected 29-bit long bit pattern obtained by adding five pieces of bit data to a 24-bit long bit pattern by the magnification correction module 402.

Figure 7B:
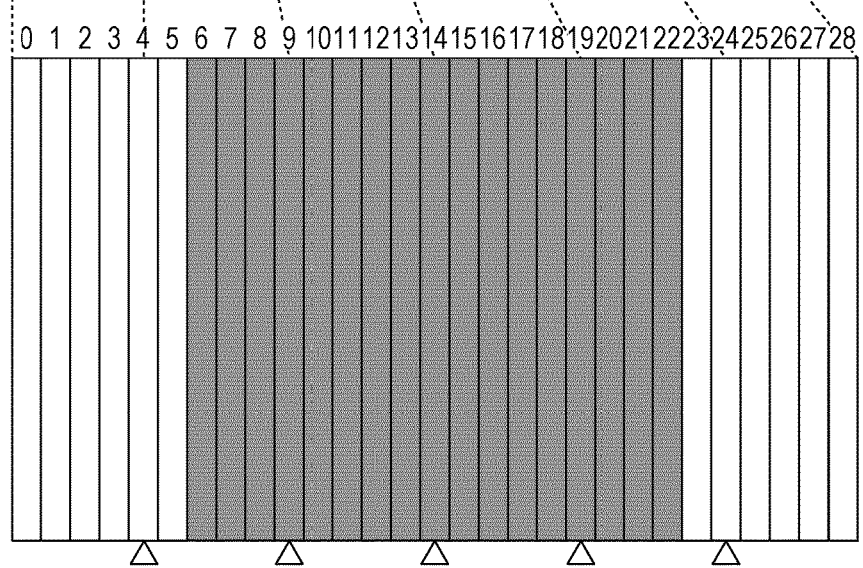

In FIGS. 7A and 7B, the horizontal direction of the figure corresponds to the main scanning direction (the scanning direction of the laser beam), and the vertical direction corresponds to the sub-scanning direction (the direction in which the photosensitive drum rotates). The divided pixels (pixel regions) 0-23 illustrated in FIG. 7A and the divided pixels (pixel regions) 0-28 illustrated in FIG. 7B each have a length of 42.3 µm (600 dpi) on a side in the sub-scanning direction. In addition, the length across the divided pixel 0 to the divided pixel 23 illustrated in FIG. 7A is 42.3 µm (600 dpi). In other words, in the present exemplary embodiment, the size of one uncorrected pixel is 42.3 µm×42.3 µm, and one pixel is constituted by 24 (pixel regions) divided pixels. That is, one pixel is divided in 24 pixel regions corresponding to the 24-bit long pixel pattern. Therefore, one divided pixel (on pixel region) corresponds to one piece of bit data processed by the CPU 303.

The triangles illustrated in FIG. 7A correspond to the positions of pieces of bit data in the 24-bit long bit pattern that are to be copied (duplicated) by the magnification correction module 402. As described above, the magnification correction module 402 determines the positions in a 24-bit long bit pattern at which bit data is to be added (copy position) on the basis of the count value of the main scan counter 405 and the correction data table illustrated in FIG. 8.

The magnification correction module 402 adds five pieces of bit data to the 24-bit long bit pattern output from the data conversion module 401 to generate a 29-bit long bit pattern, and a PWM signal corresponding to 4-bit image data is generated on the basis of this 29-bit long bit pattern. The number of rotations per unit time of the polygon mirror 204 is constant. Therefore, as five pieces of bit data are added to a 24-bit long bit pattern, the scan width of the laser beam in the main scanning direction corresponding to the 4-bit image data increases by an amount corresponding to five divided pixels (five regions of a pixel) as illustrated in FIG. 7B. Pixels corresponding to subsequent 4-bit image data are formed to the right of the divided pixels (pixel regions) 0-28 illustrated in FIG. 7B. In this manner, the magnification correction corresponding to each scanning position in the main scanning direction can be carried out by varying the number of pieces of bit data contained in a bit pattern generated from input image data in accordance with the scanning position in the main scanning direction and in accordance with the count value of the main scan counter 405.

For example, correction magnification M[x] of each pixel is defined by the following expression (1), in which N represents the number of pieces of bit data contained in a bit pattern generated by the data conversion module 401 (one pixel), x represents the pixel position in the main scanning direction, and D[x] represents the correction data corresponding to the pixel position x.

$$M[x] = \frac{N + D[x]}{N} \quad (1)$$

Here, the amount of change $D_{dif}[x]$ in the correction data between adjacent pixels is defined by the following expression (2).

$$D_{dif}[x] = D[x] - D[x-1] \quad (2)$$

As illustrated in FIGS. 14A-1 through 14B-2, the scan width per unit time in the main scanning direction continuously changes. Therefore, the number of pieces of bit data to be added per pixel needs to be changed continuously. Thus, the magnification correction data of the image forming apparatus according to the present exemplary embodiment is set so that $D_{dif}[x]$ takes any one value of −1, 0, and +1.

A method of generating the correction data by the arithmetic operation module 406 will now be described. Upon the image forming apparatus being powered on, a magnification profile D[x] is read out from the ROM 307. The arithmetic operation module 406 carries out the arithmetic operation indicated in the expression (2) and sets $D_{dif}[x]$ in an internal register (not illustrated). As illustrated in FIG. 9, $D_{dif}[x]$, which is the result of the arithmetic operation of the expression (2), is identification data for identifying correction data D[x] for a given pixel from correction data D[x−1] for a pixel immediately preceding the given pixel.

$$D_{dif}[x] = D[x] - D0(x=0)$$

The arithmetic operation module 406 receives an input of a count value x of the main scan counter 405 and outputs $D_{dif}[x]$. The arithmetic operation module 406 decodes the difference $D_{dif}[x]$ into magnification data D[x] through the following expressions.

$$D[x] = D[x-1] + D_{dif}[x](x>0)$$

$$D[x] = D0 + D_{dif}[x](x=0)$$

As described thus far, the image forming apparatus according to the present exemplary embodiment does not store magnification data for each pixel as-is as a magnification profile but stores the difference between adjacent pixels as a magnification profile. For example, if the magnification data for each pixel is to be stored as-is, D[x] needs to express nine integers in the range from 0 to 8. Therefore, in order to express nine pieces of correction data, the image forming apparatus needs a storage unit for storing 4-bit ($\geq \log_2 9$, and integer) correction data for each pixel. In contrast, according to the present exemplary embodiment, there are only three values (any one of −1, 0, and +1) that the difference for the arithmetic operation module 406 to generate the correction data can take, and thus the capacity of the storage unit for storing the correction data for each pixel can only be two bits. The aforementioned correction data is necessary for each of the pixels (e.g., 7200 pixels), and thus the configuration according to the present exemplary embodiment provides a remarkable effect on reducing the capacity of the storage unit for storing the correction data.

Now, the arithmetic operation module 406 will be described further. The arithmetic operation module 406 includes eight registers such as those illustrated in FIG. 10. Offset values, which are pseudorandom numbers, are set in the respective registers. The arithmetic operation module 406 first selects R0 for a first line of an image and sequentially selects R1 through R7 each time the main scan counter 405 is reset. Following R7, the arithmetic operation module 406 again selects R0 and repeats this operation in a similar manner thereafter. The arithmetic operation module 406 sets the offset value stored in the selected register in the value of the reset main scan counter 405. The main scan counter 405 starts counting up from the set offset value. For example, when the arithmetic operation module 406 selects R0 as a register for the first line, the arithmetic operation module 406 sets the offset value "4" in the main scan counter 405. The main scan counter 405 starts counting up from the offset value "4." When the arithmetic operation module 406 selects R1 as a register for the first line, the arithmetic operation module 406 sets the offset value "2" in the main scan counter 405. The main scan counter 405 then starts counting up from the offset value "2." In other words, the arithmetic operation module 406 corrects the count value of the main scan counter 405 on the basis of the offset value stored in the selected register at each instance of scanning so that the pixels of a similar position to be subjected to the magnification correction are not arrayed in the sub-scanning direction. In the present exemplary embodiment, eight offset values are stored in the registers. Therefore, in the image forming apparatus according to the present exemplary embodiment, the point from which the main scan counter 405 starts counting differs for each line in the eight lines.

Figure 11B:
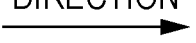

Since the count value from which the main scan counter 405 starts counting differs for each line, the pixel to be subjected to the magnification correction can be shifted in units of one pixel in the main scanning direction. FIG. 11B illustrates the number of pieces of bit data (number of bits) contained in a bit pattern of each pixel obtained when the starting point for the count value is made to vary in accordance with the eight offset values illustrated in FIG. 10. FIG. 11A illustrates a comparative example of FIG. 11B and corresponds to FIG. 14B-1. The horizontal axis in FIGS. 11A and 11B corresponds to the main scanning direction. In FIG. 11A, the point from which the main scan counter 405 starts counting is not varied for each line, and thus the corrected pixels that are each constituted by a 25-bit data set appear every three pixels in each line, and those 25-bit data sets form a line in the sub-scanning direction. In contrast, with respect to LINE 1 through LINE 8 illustrated in FIG. 11B, the register from which the offset value is read out is switched for each line in the following sequence: R6, R1, R3, R2, R0, R4, R5, and R7. In a similar manner, with respect to LINE 9 through LINE 16, the register from which the offset value is read out is switched for each line in the following sequence: R6, R1, R3, R2, R0, R4, R5, and R7. In this manner, by varying the point from which the main scan counter 405 starts counting for each line, the corrected pixels each constituted by 25-bit data set can be dispersed within the bit pattern of the image.

Figure 12:
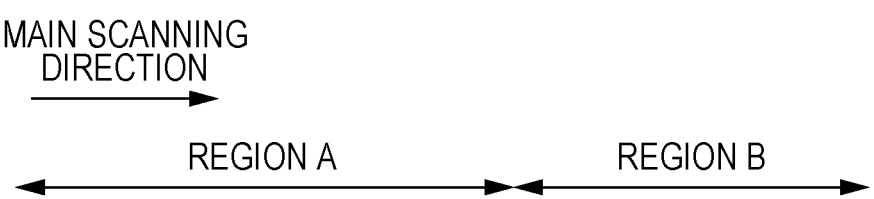
FIG. 12 illustrates a state in which correction pixels are dispersed in accordance with pseudorandom numbers.
Figure 13:
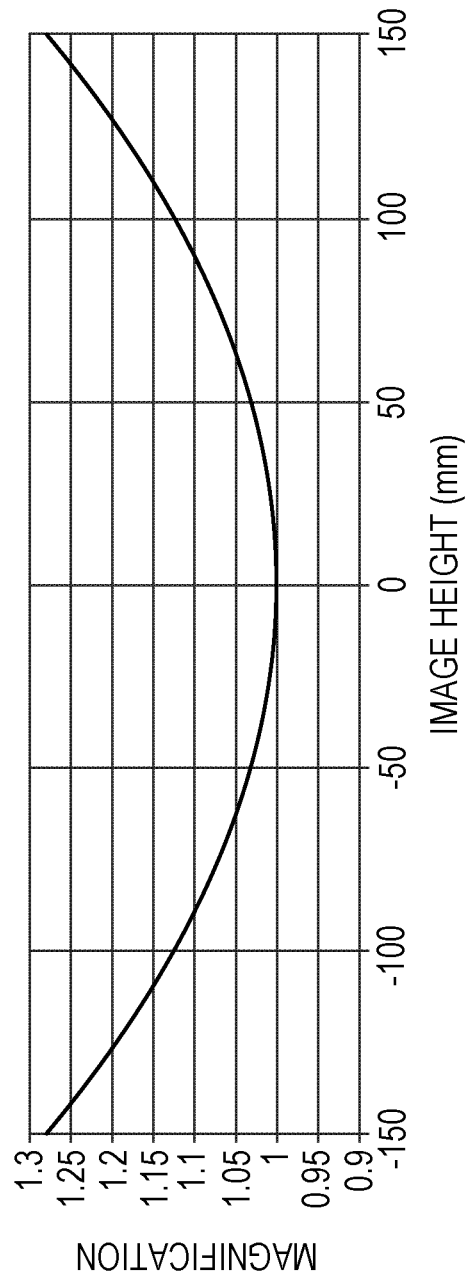
FIG. 13 illustrates a variation in the scan width on a photosensitive drum.
Figures 1, 2, 14A:
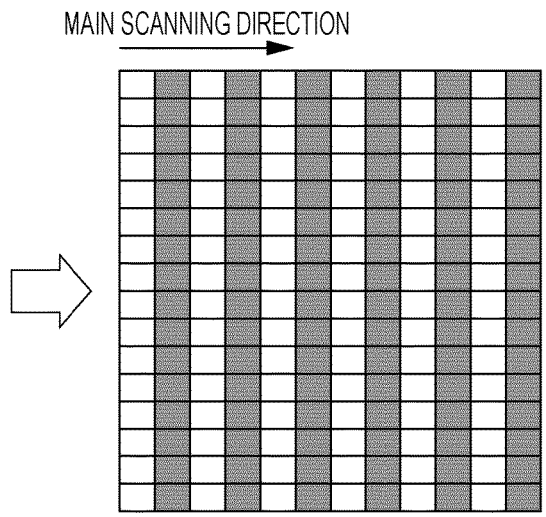
Figures 1, 2, 14B:
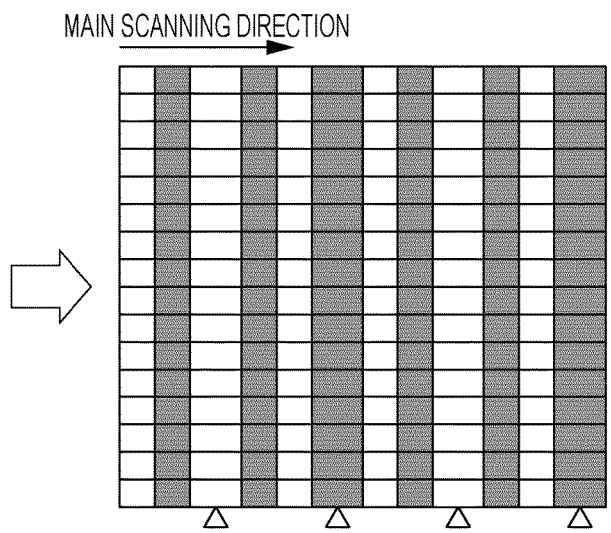

FIG. 12 illustrates a modification of FIG. 11B. The method of applying the pseudorandom numbers may be changed in different regions (e.g., A region and B region) in the main scanning direction.

In this manner, by dispersing the pixels to be corrected with the use of pseudorandom numbers, an occurrence of a moire image can be suppressed. As used herein "dispersing the pixels to be corrected" amounts to changing a position (or repositioning) of the pixel whose magnification is to be corrected from an original position (first position) along the main scanning direction to a random position (second position) along the main scanning direction of the same line, where the second position is different from the first position, for example, as illustrated in FIGS. 11B and 12.

According to the present invention, an occurrence of moire caused by correcting the magnification of image data in the main scanning direction can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-146932 filed Jul. 24, 2015, which is hereby incorporated by reference herein in its entirety.

What is claimed is:
1. An image forming apparatus, comprising:
a photosensitive member;
a laser light source configured to emit a laser beam;
a deflection unit configured to deflect the laser beam so as to scan the photosensitive member with the laser beam;
a developing unit configured to develop an electrostatic latent image formed on the photosensitive member upon the photosensitive member being scanned by the laser beam deflected by the deflection unit;
a data conversion unit configured to convert a first bit pattern indicating a data set of one pixel of an image to a second bit pattern containing a plurality of pieces of bit data that turns ON or OFF the laser light source;
a setting unit configured to set correction data for each pixel of the image in order to correct magnification of the image in a main scanning direction, the correction data corresponds to a plurality of scanning positions of the laser beam in the main scanning direction;
a correction unit configured to correct the second bit pattern on the basis of the correction data set by the setting unit and configured to add, to the second bit pattern, bit data at a number of the scanning positions on the basis of the correction data;
an output unit configured to output the bit data contained in the second bit pattern corrected by the correction unit, one bit by one bit, in synchronization with a clock signal that drives the laser light source; and a driving unit configured to turn ON or OFF a supply of an electric current to the laser light source on the basis of the bit data output by the output unit, wherein the correction unit selects within the image the magnified pixel subjected to magnification correction by using a pseudorandom number.

2. The image forming apparatus according to claim 1, wherein the correction unit includes a register configured to store the correction data and the pseudorandom number, and wherein the pseudorandom number is indicative of an offset value used by the correction unit so that the pixels of a similar position to be subjected to the magnification correction are not aligned in a sub-scanning direction.

3. The image forming apparatus according to claim 1, wherein the clock signal is a signal having a constant frequency, and wherein the clock signal is multiplied times a number of bits corresponding to the bit data contained in the second bit pattern corrected by the correction unit.

4. The image forming apparatus according to claim 1, wherein no lens is disposed on an optical path of the laser beam deflected by the deflection unit between the deflection unit and the photosensitive member.

5. An image forming apparatus, comprising:

a photosensitive member;

a laser light source configured to emit a laser beam;

a deflection unit configured to deflect the laser beam so as to scan the photosensitive member with the laser beam;

a developing unit configured to develop an electrostatic latent image formed on the photosensitive member upon the photosensitive member being scanned by the laser beam deflected by the deflection unit;

a data conversion unit configured to convert a first bit pattern indicating a density of one pixel of an image to a second bit pattern containing a plurality of pieces of bit data that turns ON or OFF the laser light source;

a storage unit configured to store a plurality of pieces of magnification correction data each of which corresponds a different one of a plurality of regions in a scanning direction of the laser beam, wherein the plurality of regions includes a plurality of pixels;

a correction unit configured to correct, based on the plurality of pieces of magnification correction data respectively corresponding to the different one of the plurality of regions, the number of bit data of the second bit pattern corresponding to the plurality of pixels contained in the plurality of regions, wherein the plurality of regions includes a region where each pixel is formed by the second bit pattern containing the same number of the bit data, and a region where each pixel is formed by the second bit pattern containing the different number of the bit data;

an output unit configured to output the bit data contained in the second bit pattern corrected by the correction unit, one bit by one bit, in synchronization with a clock signal that drives the laser light source; and a driving unit configured to turn ON or OFF a supply of an electric current to the laser light source on the basis of the bit data output by the output unit.

6. The image forming apparatus according to claim 5, wherein, with regard to the region where each pixel is formed by the second bit pattern containing the different number of the bit data, the correction unit executes a process to every scanning line of the laser beam to randomly array the pixels formed by the second bit pattern containing the different number of the bit data.

7. The image forming apparatus according to claim 6, wherein the correction unit executes the process to randomly array the pixels by utilizing a pseudorandom number.

8. The image forming apparatus according to claim 5, wherein the magnification correction data contains a piece of data indicating a position, with respect to a row of the bit data contained in the second bit pattern, where to insert a bit data for correcting a magnification.

9. The image forming apparatus according to claim 5, wherein the clock signal is a signal having a constant frequency.

10. The image forming apparatus according to claim 5, wherein no lens is disposed on an optical path of the laser beam deflected by the deflection unit between the deflection unit and the photosensitive member.

* * * * *